United States Patent

Hutchison et al.

(10) Patent No.: US 6,632,863 B2
(45) Date of Patent: Oct. 14, 2003

(54) CELLULOSE/POLYOLEFIN COMPOSITE PELLET

(75) Inventors: Herbert L. Hutchison, Blacklick, OH (US); Jeffrey R. Brandt, Blacklick, OH (US)

(73) Assignee: Crane Plastics Company LLC, Columbus, OH (US)

( * ) Notice: Subject to any disclaimer, the term of this patent is extended or adjusted under 35 U.S.C. 154(b) by 0 days.

(21) Appl. No.: 10/001,530

(22) Filed: Oct. 25, 2001

(65) Prior Publication Data

US 2003/0087996 A1 May 8, 2003

(51) Int. Cl.$^7$ .............. C08J 5/10; C08L 23/00
(52) U.S. Cl. .............. 524/13; 524/9; 524/14; 524/15; 524/16; 524/277; 524/449; 524/451; 264/122; 264/211; 264/211.11
(58) Field of Search .............. 524/9, 13, 14, 524/15, 16, 35, 277, 449, 451; 264/122, 211, 211.11

(56) References Cited

U.S. PATENT DOCUMENTS

| | | | |
|---|---|---|---|
| 2,188,396 A | 1/1940 | Semon | 18/55 |
| 2,489,373 A | 11/1949 | Gilman | 260/37 |
| 2,519,442 A | 8/1950 | Delorme et al. | 260/37 |
| 2,558,378 A | 6/1951 | Petry | 260/41 |
| 2,635,976 A | 4/1953 | Meiler et al. | 154/132 |
| 2,680,102 A | 6/1954 | Becher | 260/17.3 |
| 2,789,903 A | 4/1957 | Lukman et al. | 92/21 |
| 2,935,763 A | 5/1960 | Newman et al. | 18/55 |
| 3,287,480 A | 11/1966 | Wechsler et al. | 264/122 |
| 3,308,218 A | 3/1967 | Etal | 264/121 |
| 3,309,444 A | 3/1967 | Schueler | 264/109 |
| 3,492,388 A | 1/1970 | Inglin-Knüsel | 264/129 |
| 3,493,527 A | 2/1970 | Schueler | 260/17.2 |
| 3,562,373 A | 2/1971 | Logrippo | 264/118 |
| 3,645,939 A | 2/1972 | Gaylord | 260/17.4 GC |
| 3,671,615 A | 6/1972 | Price | 264/39 |
| 3,864,201 A | 2/1975 | Susuki et al. | 161/160 |
| 3,867,493 A | 2/1975 | Seki | 264/45.9 |
| 3,878,143 A | 4/1975 | Baumann et al. | 260/17.4 R |
| 3,879,505 A | 4/1975 | Boutillier et al. | 264/48 |
| 3,888,810 A | 6/1975 | Shinomura | 260/17.4 BB |
| 3,899,559 A | 8/1975 | Johanson et al. | 264/115 |

(List continued on next page.)

FOREIGN PATENT DOCUMENTS

| | | |
|---|---|---|
| DE | 2042176 | 4/1971 |
| DE | 3801574 | 8/1989 |
| DE | 4033849 | 10/1990 |

(List continued on next page.)

OTHER PUBLICATIONS

Bendtsen et al., Mechanical Properties of Wood, pp. 4–2 to 4–44.

Bibliography of Solid Phase Extrusion, pp. 187–195.

Brzoskowski et al., Air–Lubricated Die for Extrusion of Rubber Compounds, Rubber Chemistry and Technology, vol. 60, p. 945–956.

Collier et al., High Strength Extrudates by Melt Transformation Coextrusion, ANTEC, 1987, pp. 497–502.

(List continued on next page.)

*Primary Examiner*—James J. Seidleck
*Assistant Examiner*—U. K. Rajguru
(74) *Attorney, Agent, or Firm*—Standley & Gilchrest LLP (57) ABSTRACT

A cellulose/polyolefin pellet comprising polyolefin material and cellulosic material. The pellet may be concentrated such that it contains less than about 20% by weight of the polyolefin material and at least about 55% by weight of the cellulosic material. The pellet may be shipped to a remote manufacturing location where it may be blended with additional polyolefin material to make a synthetic wood component.

14 Claims, 2 Drawing Sheets

U.S. PATENT DOCUMENTS

| | | | |
|---|---|---|---|
| 3,922,328 A | 11/1975 | Johnson | 264/46.1 |
| 3,931,384 A | 1/1976 | Forquer et al. | 264/120 |
| 3,943,079 A | 3/1976 | Hamed | 260/17.4 BB |
| 3,954,555 A | 5/1976 | Kole et al. | 162/136 |
| 3,956,541 A | 5/1976 | Pringle | 428/2 |
| 3,956,555 A | 5/1976 | McKean | 428/106 |
| 3,969,459 A | 7/1976 | Fremont et al. | 264/109 |
| 4,005,162 A | 1/1977 | Bucking | 264/25 |
| 4,012,348 A | 3/1977 | Chelland et al. | 260/28.5 R |
| 4,016,232 A | 4/1977 | Pringle | 264/112 |
| 4,016,233 A | 4/1977 | Pringle | 264/122 |
| 4,018,722 A | 4/1977 | Baker | 260/2.3 |
| 4,029,831 A | 6/1977 | Daunheimer | 427/264 |
| 4,045,603 A | 8/1977 | Smith | 428/2 |
| 4,056,591 A | 11/1977 | Goettler et al. | 264/108 |
| 4,058,580 A | 11/1977 | Flanders | 264/113 |
| 4,071,479 A | 1/1978 | Broyde et al. | 260/2.3 |
| 4,071,494 A | 1/1978 | Gaylord | 260/42.14 |
| 4,097,648 A | 6/1978 | Pringle | 428/326 |
| 4,102,106 A | 7/1978 | Golder et al. | 52/533 |
| 4,107,110 A | 8/1978 | Lachowicz et al. | 260/17.4 CL |
| 4,115,497 A | 9/1978 | Halmo et al. | 264/115 |
| 4,145,389 A | 3/1979 | Smith | 264/40.7 |
| 4,157,415 A | 6/1979 | Lindenberg | 428/284 |
| 4,168,251 A | 9/1979 | Schinzel et al. | 260/17.4 R |
| 4,178,411 A | 12/1979 | Cole et al. | 428/310 |
| 4,181,764 A | 1/1980 | Totten | 428/155 |
| 4,187,352 A | 2/1980 | Klobbie | 521/79 |
| 4,191,798 A | 3/1980 | Schumacher et al. | 428/95 |
| 4,203,876 A | 5/1980 | Dereppe et al. | 260/17.4 R |
| 4,228,116 A | 10/1980 | Colombo et al. | 264/119 |
| 4,239,679 A | 12/1980 | Rolls et al. | 260/42.49 |
| 4,241,133 A | 12/1980 | Lund et al. | 428/326 |
| 4,244,903 A | 1/1981 | Schnause | 264/68 |
| 4,248,743 A | 2/1981 | Goettler | 260/17.4 BB |
| 4,248,820 A | 2/1981 | Haataja | 264/113 |
| 4,250,222 A | 2/1981 | Mavel et al. | 428/285 |
| 4,263,184 A | 4/1981 | Leo et al. | 260/17.4 CL |
| 4,263,196 A | 4/1981 | Schumacher et al. | 260/33.6 |
| 4,272,577 A | 6/1981 | Lyng | 428/112 |
| 4,273,688 A | 6/1981 | Porzel et al. | 260/17.4 R |
| 4,277,428 A | 7/1981 | Luck et al. | 264/118 |
| 4,290,988 A | 9/1981 | Nopper et al. | 264/112 |
| 4,303,019 A | 12/1981 | Haataja et al. | 108/51.1 |
| 4,305,901 A | 12/1981 | Prince et al. | 264/176 R |
| 4,317,765 A * | 3/1982 | Gaylord | 523/204 |
| 4,323,625 A | 4/1982 | Coran et al. | 428/361 |
| 4,376,144 A | 3/1983 | Goettler | 428/36 |
| 4,382,108 A | 5/1983 | Carroll et al. | 428/326 |
| 4,382,758 A | 5/1983 | Nopper et al. | 425/82.1 |
| 4,393,020 A | 7/1983 | Li et al. | 264/108 |
| 4,414,267 A | 11/1983 | Coran et al. | 428/288 |
| 4,420,351 A | 12/1983 | Lussi et al. | 156/62.4 |
| 4,430,468 A | 2/1984 | Schumacher | 524/109 |
| 4,440,708 A | 4/1984 | Haataja et al. | 264/109 |
| 4,480,061 A | 10/1984 | Coughlin et al. | 524/13 |
| 4,481,701 A | 11/1984 | Hewitt | 29/416 |
| 4,491,553 A | 1/1985 | Yamada et al. | 264/51 |
| 4,503,115 A | 3/1985 | Hemels et al. | 428/281 |
| 4,505,869 A | 3/1985 | Nishibori | 264/115 |
| 4,506,037 A | 3/1985 | Suzuki et al. | 521/82 |
| 4,508,595 A | 4/1985 | Gåsland | 162/158 |
| 4,562,218 A | 12/1985 | Fornadel et al. | 524/15 |
| 4,582,869 A * | 4/1986 | Waggoner | 524/227 |
| 4,594,372 A | 6/1986 | Natov et al. | 523/208 |
| 4,597,928 A | 7/1986 | Terentiev et al. | 264/87 |
| 4,610,900 A | 9/1986 | Nishibori | 428/15 |
| 4,645,631 A | 2/1987 | Hegenstaller et al. | 264/69 |
| 4,659,754 A | 4/1987 | Edwards et al. | 523/214 |
| 4,663,225 A | 5/1987 | Farley et al. | 428/290 |
| 4,687,793 A | 8/1987 | Motegi et al. | 523/200 |
| 4,717,742 A | 1/1988 | Beshay | 523/203 |
| 4,734,236 A | 3/1988 | Davis | 264/112 |
| 4,737,532 A | 4/1988 | Fujita et al. | 524/13 |
| 4,746,688 A | 5/1988 | Bistak et al. | 523/220 |
| 4,769,109 A | 9/1988 | Tellvik et al. | 162/123 |
| 4,769,274 A | 9/1988 | Tellvik et al. | 428/218 |
| 4,783,493 A | 11/1988 | Motegi et al. | 524/13 |
| 4,789,604 A | 12/1988 | van der Hoeven | 428/503 |
| 4,790,966 A | 12/1988 | Sandberg et al. | 264/39 |
| 4,791,020 A | 12/1988 | Kokta | 428/326 |
| 4,801,495 A | 1/1989 | van der Hoeven | 428/286 |
| 4,818,604 A | 4/1989 | Tock | 428/319.9 |
| 4,820,749 A | 4/1989 | Beshay | 523/203 |
| 4,851,458 A | 7/1989 | Hopperdietzel | 523/205 |
| 4,865,788 A | 9/1989 | Davis | 264/112 |
| 4,889,673 A | 12/1989 | Takimoto | 264/118 |
| 4,894,192 A | 1/1990 | Warych | 264/68 |
| 4,915,764 A | 4/1990 | Miani | 156/244.19 |
| 4,927,572 A | 5/1990 | van der Hoeven | 264/22 |
| 4,927,579 A | 5/1990 | Moore | 264/101 |
| 4,935,182 A | 6/1990 | Ehner et al. | 264/112 |
| 4,960,548 A | 10/1990 | Ikeda et al. | 264/40.4 |
| 4,968,463 A | 11/1990 | Levasseur | 264/40.1 |
| 4,973,440 A | 11/1990 | Tamura et al. | 264/114 |
| 4,978,489 A | 12/1990 | Radvan et al. | 264/118 |
| 4,988,478 A | 1/1991 | Held | 264/518 |
| 5,002,713 A | 3/1991 | Palardy et al. | 264/109 |
| 5,008,310 A | 4/1991 | Beshay | 524/13 |
| 5,009,586 A | 4/1991 | Pallmann | 425/311 |
| 5,049,334 A | 9/1991 | Bach | 264/122 |
| 5,057,167 A | 10/1991 | Gersbeck | 156/62.2 |
| 5,064,592 A | 11/1991 | Ueda et al. | 264/112 |
| 5,075,057 A | 12/1991 | Hoedl | 264/115 |
| 5,075,359 A | 12/1991 | Castagna et al. | 524/13 |
| 5,078,937 A | 1/1992 | Eela | 264/109 |
| 5,082,605 A | 1/1992 | Brooks et al. | 264/40.6 |
| 5,087,400 A | 2/1992 | Theuveny | 264/115 |
| 5,088,910 A | 2/1992 | Goforth et al. | 425/142 |
| 5,096,046 A | 3/1992 | Goforth et al. | 198/604 |
| 5,096,406 A | 3/1992 | Brooks et al. | 425/205 |
| 5,120,776 A | 6/1992 | Raj et al. | 524/13 |
| 5,153,241 A | 10/1992 | Beshay | 524/8 |
| 5,194,461 A | 3/1993 | Bergquist et al. | 524/13 |
| 5,219,634 A | 6/1993 | Aufderhaar | 428/156 |
| 5,272,000 A | 12/1993 | Chenoweth et al. | 428/283 |
| 5,276,082 A | 1/1994 | Forry et al. | 524/504 |
| 5,288,772 A | 2/1994 | Hon | 524/35 |
| 5,302,634 A | 4/1994 | Mushovic | 523/219 |
| 5,369,147 A | 11/1994 | Mushovic | 523/219 |
| 5,406,768 A | 4/1995 | Giuseppe et al. | 52/730.4 |
| 5,422,170 A | 6/1995 | Iwata et al. | 428/218 |
| 5,435,954 A | 7/1995 | Wold | 264/115 |
| 5,441,801 A | 8/1995 | Deaner et al. | 428/326 |
| 5,458,834 A | 10/1995 | Faber et al. | 264/109 |
| 5,474,722 A | 12/1995 | Woodhams | 264/45.3 |
| 5,480,602 A | 1/1996 | Nagaich | 264/122 |
| 5,486,553 A | 1/1996 | Deaner et al. | 524/13 |
| 5,497,594 A | 3/1996 | Giuseppe et al. | 52/730.4 |
| 5,516,472 A | 5/1996 | Laver | 264/118 |
| 5,518,677 A | 5/1996 | Deaner et al. | 264/142 |
| 5,532,065 A | 7/1996 | Gübitz et al. | 428/480 |
| 5,537,789 A | 7/1996 | Minke et al. | 52/313 |
| 5,539,027 A | 7/1996 | Deaner et al. | 524/13 |
| 5,576,374 A | 11/1996 | Betso et al. | 524/451 |
| 5,585,155 A | 12/1996 | Heikklia et al. | 428/36 |
| 5,593,625 A | 1/1997 | Riebel et al. | 264/115 |
| 5,695,874 A | 12/1997 | Deaner et al. | 428/326 |
| 5,733,085 A * | 3/1998 | Shida et al. | 411/442 |
| 5,773,138 A | 6/1998 | Seethamraju et al. | 428/326 |
| 5,827,607 A | 10/1998 | Deaner et al. | 428/326 |

| | | | |
|---|---|---|---|
| 5,882,564 A | 3/1999 | Puppin | 264/177.16 |
| 5,932,334 A | 8/1999 | Deaner et al. | 428/292.4 |
| 5,948,505 A | 9/1999 | Puppin | 428/121 |
| 5,948,524 A | 9/1999 | Seethamraju et al. | 428/326 |
| 5,981,067 A | 11/1999 | Seethamraju et al. | 428/393 |
| 5,985,429 A | 11/1999 | Plummer et al. | 428/220 |
| 6,004,668 A | 12/1999 | Deaner et al. | 428/326 |
| 6,007,656 A | 12/1999 | Heikkila et al. | 156/180 |
| 6,011,091 A | 1/2000 | Zehner | 524/13 |
| 6,015,611 A | 1/2000 | Deaner et al. | 428/326 |
| 6,015,612 A | 1/2000 | Deaner et al. | 428/326 |
| 6,054,207 A | 4/2000 | Finley | 428/317.9 |
| 6,106,944 A | 8/2000 | Heikkila et al. | 428/397 |
| 6,122,877 A | 9/2000 | Hendrickson et al. | 52/520 |
| 6,207,729 B1 * | 3/2001 | Medoff et al. | 523/129 |
| 6,210,792 B1 | 4/2001 | Seethamraju et al. | 428/326 |
| 6,265,037 B1 | 7/2001 | Godavarti et al. | 428/34 |
| 6,280,667 B1 | 8/2001 | Koenig et al. | 264/68 |
| 6,342,172 B1 | 1/2002 | Finley | 264/45.3 |
| 6,346,160 B1 | 2/2002 | Puppin | 156/88 |
| 6,357,197 B1 | 3/2002 | Serino et al. | 52/738.1 |
| 6,409,952 B1 * | 6/2002 | Hacker et al. | 264/171.1 |
| 2001/0019749 A1 | 9/2001 | Godavarti et al. | 428/34.2 |
| 2001/0051242 A1 | 12/2001 | Godavarti et al. | 428/36.9 |
| 2001/0051243 A1 | 12/2001 | Godavarti et al. | 428/36.9 |
| 2002/0015820 A1 | 2/2002 | Puppin | 428/121 |
| 2002/0038684 A1 | 4/2002 | Puppin | 156/88 |
| 2002/0092256 A1 | 7/2002 | Hendrickson et al. | 52/519 |

FOREIGN PATENT DOCUMENTS

| | | |
|---|---|---|
| DE | 4221070 | 12/1993 |
| EP | 0269470 | 1/1988 |
| EP | 0586211 | 3/1994 |
| EP | 0586212 | 3/1994 |
| EP | 0586213 | 3/1994 |
| EP | 0747419 | 12/1996 |
| FR | 2270311 | 2/1974 |
| FR | 2365017 | 4/1978 |
| FR | 2445885 | 8/1980 |
| FR | 2564374 | 11/1985 |
| GB | 1443194 | 7/1976 |
| GB | 2036148 | 6/1980 |
| GB | 2104903 | 3/1983 |
| GB | 2171953 | 9/1986 |
| GB | 2186655 | 8/1987 |
| WO | WO 90/08020 | 7/1990 |

OTHER PUBLICATIONS

Collier et al., Streamlined Dies and Profile Extrusion, ANTEC, 1987, pp. 203–206.

Company News, Plastics Industry News, May 1994, pp. 70–71.

Dalväg et al., The Efficiency of Cellulosic Fillers in Common Thermoplastics. Part II. Filling with Processing Aids and Coupling Agents, 1985, vol. 11, pp. 9–38.

Fiberloc Polymer Composites, B.F. Goodrich, Geon Vinyl Division, section 1, pp. 2–15.

Fill Thermoplastics with Wood, Modern Plastics, May 1974, pp. 54–55.

Fillers for Thermoplastics: Beyond Resin Stretching, Modern Plastics International, Oct. 1976, pp. 12–15.

From Sweden: Extruded Interior Trim Made of PVC and Wood Flour, Plastic Building Construction, vol. 9 No. 5, 1986. pp. 5–6.

Henrici–Olive et al., Integral/Structural Ploymer Foams, Technology, Properties and Applications, Springer–Verlag, pp. 111–122.

Klason et al., The Efficiency of Cellulosic Fillers in Common Thermoplastics. Part 1. Filling without Processing Aids or Coupling Agents, Polymeric Materials, 1984, vol. 10, pp. 159–187.

Kokta et al., Composites of Poly(Vinyl Chloride) and Wood Fibers. Part II: Effect of Chemical Treatment, Polymer Composites, Apr. 1990, pp. 84–89.

Kokta et al., Composites of Polyvinyl Chloride—Wood Fibers. I. Effect of Isocyanate as a Bonding Agent, Polym.—Plast. Technol. Eng., 1990, 29(1&2), pp. 87–118.

Kokta et al., Composites of Polyvinyl Chloride—Wood Fibers. III: Effect of Silane as Coupling Agent, Journal of Vinyl Technology, Sep. 1990, pp. 146–153.

Kokta et al., Use of Grafted Wood Fibers in Thermoplastic Composites v. Polystyrene, Centre de recherche en pâtes et papiers, Université du Quèbec á Trois–Rivières, Canada.

Kokta et al., Use of Wood Fibers in Thermoplastic Composites, Polymer Composites, Oct. 1983, pp. 229–232.

Maldas et al., Composites of Polyvinyl Chloride—Wood Fibers: IV. Effect of the Nature of Fibers, Journal of Vinyl Technology, Jun. 1989, pp. 90–98.

Maldas, et al.. Improving Adhesion of Wood Fiber with Polystrene by the Chemical Treatment of Fiber with a Coupling Agent and the Influence on the Mechanical Properties of Composites, Journal of Adhesion Science Technology, vol. 3 No. 7, pp. 529–539 (1989).

Myers et al., "Wood flour and polypropylene or high–density polyethylene composites: influence of maleated polypropylene concentration and extrusion temperature on properties", "Wood Fiber/Polymer Composites: Fundamental Concepts, Processes, and Material Options", pp. 49–56.

Myers et al., Bibliography: Composites from Plastics and Wood–Based Fillers, USDA Forest Products Laboratory, Madison, WI, pp. 1–27 odds (1991).

Myers et al., Effects of Composition and Polypropylene Melt Flow on Polypropylene—Waste Newspaper Composites, ANTEC, 1984, pp. 602–604.

Pornnimit et al., Extrusion of Self–Reinforced Polyethylene, Advances in Polymer Technology, vol. 11, No. 2, pp. 92–98.

Raj et al., Use of Wood Fiber as Filler in Common Thermoplastics: Studies on Mechanical Properties, Science and Engineering of Composite Materials, vol. 1 No. 3, 1989, pp. 85–98.

Raj et al., Use of Wood Fibers in Thermoplastics, VII. The Effect of Coupling Agents in Polyethylene—Wood Fiber Composites, Journal of Applied Polymer Science, vol. 37, pp. 1089–1103 (1989).

Resin Stretching: Accent on Performance, Modern Plastics International, Jan. 1974, pp. 58–60.

Rogalski et al., Poly(Vinyl–Chloride) Wood Fiber Composites, ANTEC, 1987, pp. 1436–1441.

Sonwood Outline, Apr. 1975.

Sonwood: a new PVC wood–flour alloy for Extrusions and other Plastic Processing Techniques, Sonesson Plast AB, Malmo, Sweden.

Thomas et al., Wood Fibers for Reinforcing Fillers for Polyolefins, ANTEC, 1984, pp. 687–689.

Wood Filled PVC, Plastics Industry News, Jul. 1996, p. 6.

Woodhams et al., Wood Fibers for Reinforcing Fillers for Polyolefins, Polymer Engineering and Science, Oct. 1984, pp. 1166–1171.

Yam et al., Composites from Compounding Wood Fibers With Recycled High Density Polyethylene, Polymer Engineering and Science, mid–Jun. 1990, pp. 693–699, vol. 30, No. 11.

Yuskova, et al., Interaction of Components in Poly(Vinyl Choloride) Filled in Polymetization, Makroniol Chem., Macromol. Symp. 29, 315–320 (1989).

Zadorecki et al., Future Prospects for Wood Cellulose as Reinforcement in Organic Polymer Composites, Polymer Composites, Apr. 1989, pp. 69–77.

* cited by examiner

CELLULOSE/POLYOLEFIN COMPOSITE PELLET

BACKGROUND AND SUMMARY OF THE INVENTION

The present invention relates generally to synthetic wood composite materials. More particularly, the present invention is directed to a cellulose/polyolefin composite pellet and related manufacturing methods. The pellet may be used to manufacture a wide variety of components.

The supply of natural woods for construction and other purposes is dwindling. As a result, many are concerned about conserving the world's forests, as the cost of natural woods has risen. Because of the extensive time needed to replenish forests, a tremendous demand has developed in recent years for alternative composites that look and feel like natural woods.

In response, many composites, such as cellulosic/polymer composites, are used as replacements for all-natural wood, particleboard, wafer board, and other similar material. For example, U.S. Pat. Nos. 3,908,902, 4,091,153, 4,686,251, 4,708,623, 5,002,713, 5,005,247, 5,087,400, and 5,151,238 relate to processes for making wood replacement products. As compared to natural woods, cellulosic/polymer composites offer superior resistance to wear and tear. In particular, cellulosic/polymer composites have enhanced resistance to moisture. In fact, it is well known that the retention of moisture is a primary cause of the warping, splintering, and discoloration of natural woods. Moreover, cellulosic/polymer composites have the appearance of natural wood, and they may be sawed, sanded, shaped, turned, fastened, and finished in the same manner as natural woods. Consequently, cellulosic/polymer composites are commonly used for applications such as interior and exterior decorative house moldings, picture frames, furniture, porch decks, deck railings, window moldings, window components, door components, roofing structures, building siding, and other suitable indoor and outdoor components.

Nevertheless, those skilled in the art have recognized that excessive moisture content in a synthetic wood composition may result in a poor quality end product. In particular, excessive moisture content in a synthetic wood composition may result in an end component that is susceptible to cracking, blistering, and deteriorating appearance. Consequently, it may be necessary to dry any cellulosic material to a predetermined level prior to introducing it into the synthetic wood composition. Even after the cellulosic material is dried, it has a natural tendency to reabsorb moisture from the environment. As a result, it may also be necessary to store the dried cellulosic material in a moisture controlled environment in order to prevent the cellulosic material from reabsorbing additional moisture before being added to the synthetic wood composition. In light of these considerations, it may be difficult and costly to maintain sufficiently dry cellulosic material while shipping it between different locations.

The present invention relates generally to composite materials. The present invention includes several different formulations and material composites including, but not limited to, formulations that include cellulosic material and/or inorganic material. The filler material may be mixed with a polyolefin material to make a variety of components. In addition, the composition of the present invention may be used as an alternative to natural wood, other synthetic wood compositions, plastics, metals, and other conventional materials for making various types of components.

The present invention provides various compositions wherein some or all of the ingredients may be combined to form pellets. The pellets may be shipped to various manufacturing locations substantially without reabsorbing a detrimental amount of moisture content. An exemplary embodiment of the composite pellet may comprise at least one polyolefin material and at least one cellulosic material. The pellet may also include some or all of any other desired ingredients of the composition including, but not limited to, stabilizers, lubricants, process aids, inorganic fillers, accelerators, inhibitors, enhancers, compatibilizers, blowing agents, foaming agents, thermosetting materials, colorants, and other similar, suitable, or conventional additives. If the pellet does not include all of the ingredients of the composition, the remaining ingredients may be combined with the pellets prior to forming the end product. For example, additional polyolefin material may be mixed with the pellets in a dry mixing device and/or in a blending device, e.g., an extruder, if the pellets do not include the entire amount of the polyolefin material. For another example, some or the entire amount of the other additives may be mixed with the pellets in a dry mixing device and/or in a blending device, e.g., an extruder, if not included in the pellets at all or in their entirety.

In addition to the novel features and advantages mentioned above, other objects and advantages of the present invention will be readily apparent from the following descriptions of the drawings and exemplary embodiments.

DETAILED DESCRIPTION OF THE EXEMPLARY EMBODIMENT(S)

The present invention is directed to a composite pellet and related manufacturing methods. The pellet of the present invention may be used in suitable applications as a substitute for natural wood, particleboard, wafer board, other synthetic wood compositions, metals, plastics, and other similar or conventional construction materials. For example, the pellet may be used to make interior and exterior decorative house moldings, picture frames, furniture, furniture edges, porch decks, deck railings, window moldings, window components, door components, roofing structures, building siding, and other suitable indoor and outdoor items that do not exceed the structural capabilities of the composition.

A pellet of an exemplary embodiment may comprise, but is not limited to, at least one cellulosic material and at least one polyolefin material. A pellet may also include any other additives in the synthetic wood composition including, but not limited to, inorganic fillers, cross-linking agents, lubricants, stabilizers, process aids, accelerators, inhibitors, enhancers, compatibilizers, blowing agents, foaming agents, thermosetting materials, colorants, and other similar, suitable, or conventional materials. Examples of cellulosic materials include sawdust, wood particles, wood flour, wood fibers, wood chips, ground wood, wood flakes, wood veneers, wood laminates, paper, newspapers, alfalfa, wheat pulp, cardboard, straw, cotton, rice hulls, coconut shells, peanut shells, bagasse, plant fibers, bamboo fibers, palm fibers, kenaf, and other similar, suitable, or conventional materials. Examples of polyolefin materials include high density polyethylene, low density polyethylene, polypropylene, and other similar, suitable, or conventional polyolefin materials. Examples of inorganic fillers include talc, calcium carbonate, kaolin clay, magnesium oxide, titanium dioxide, silica, mica, barium sulfate, acrylics, and other similar, suitable, or conventional materials. Examples of lubricants include zinc stearate, calcium stearate, esters, amide wax, paraffin wax, ethylene bis stearamide, and other similar, suitable, or conventional materials. Examples of stabilizers include tin stabilizers, lead and metal soaps such as barium, cadmium, and zinc, and other similar, suitable, or conventional materials. Examples of process aids include acrylic modifiers, fatty acids, and other similar, suitable or conventional materials. In addition, examples of thermosetting materials include polyurethanes, such as isocyanates, phenolic resins, unsaturated polyesters, epoxy resins, and other similar, suitable, or conventional materials. Combinations of the aforementioned materials are also examples of thermosetting materials.

The relative amounts of the various ingredients may be chosen to achieve the desired characteristics of the composition. One exemplary embodiment of the present invention is a composite pellet comprised of at least one cellulosic material and at least one polyolefin material. The pellet may include all or only a portion of the at least one polyolefin material. Additionally, the pellet may include all or a portion of any other remaining ingredients of the composition. Any ingredient not included in the pellet may be mixed with the pellet to form the end product.

In an exemplary embodiment, the cellulosic material may be present in the pellet in an amount between about 45% and about 90% by weight, between about 55% and about 90% by weight, between about 63% and about 88% by weight, or between about 65% and about 85% by weight. In an exemplary embodiment, the polyolefin material may be present in the pellet in an amount between about 10% and about 40% by weight, between about 10% and about 30% by weight, or between about 10% and about 20% by weight. Additional ingredients (including, but not limited to, additives as noted above) may be present in the pellet in an amount between about 0% and about 35% by weight, between about 0% and about 27% by weight, or between about 0.5% and about 25% by weight. The preferred amounts of the cellulosic material, the polyolefin material, and any additional ingredients may vary based on many factors including the desired use of the pellet (e.g., a concentrated pellet may include a higher content of cellulosic material). In some embodiments of the present invention, the amounts of the cellulosic material, the polyolefin material, and any additional ingredients may be outside, i.e., above or below, the above ranges.

Prior to making the pellet, the cellulosic material may be dried to a desired moisture content. For example, the cellulosic material may be dried to about 0% to about 10% moisture content by weight, more preferably to about 0% to about 5% moisture content by weight, still more preferably to about 0% to about 3% moisture content by weight. However, it is appreciated that the cellulosic composite concentrate may have a moisture content greater than about 10% by weight. Nevertheless, excessive moisture may cause manufacturing defects as noted above.

Figure 1:
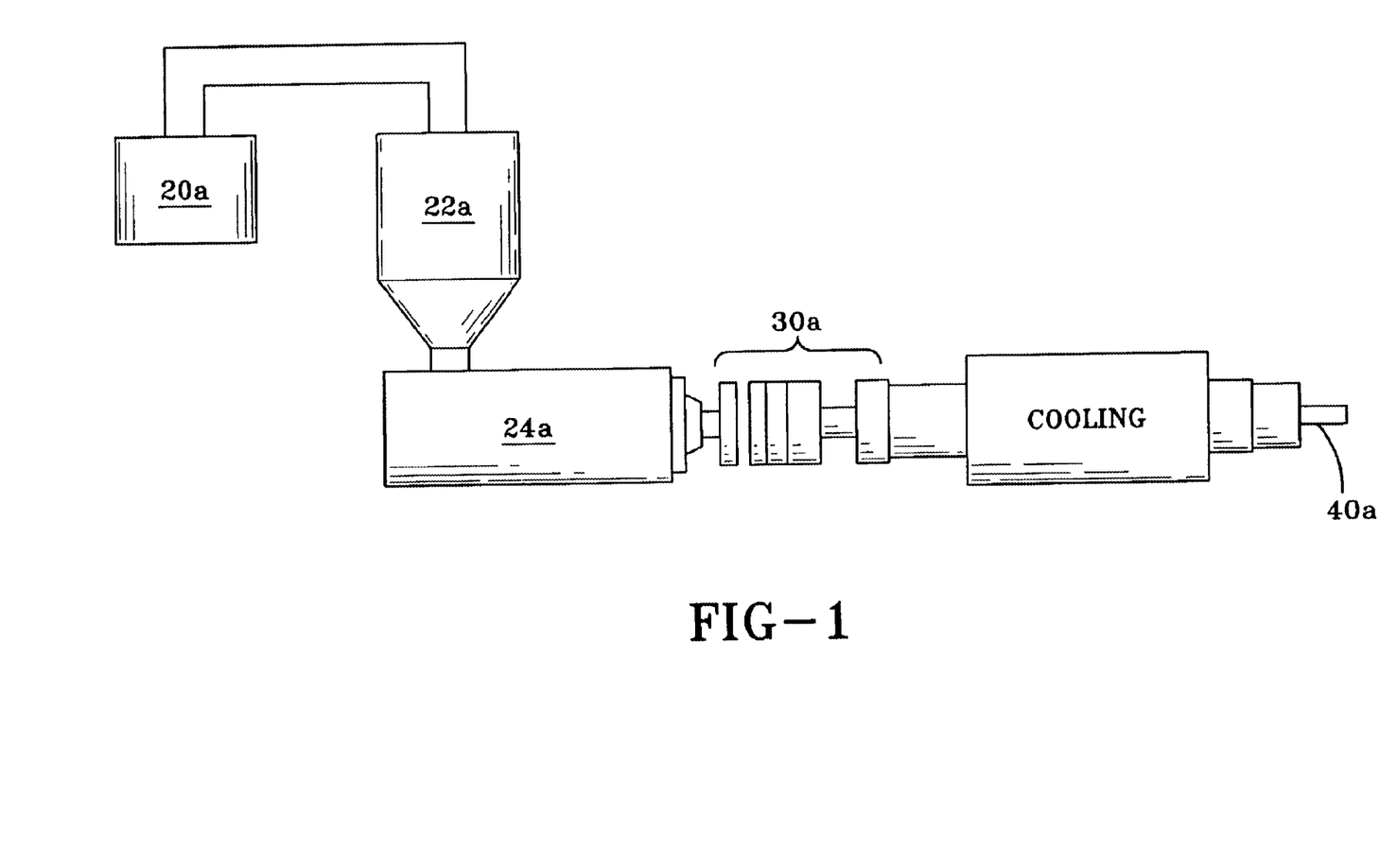
FIG. 1 is a schematic diagram of an exemplary embodiment for using a composite pellet of the present invention.

The composite pellet may be processed by extrusion, compression molding, injection molding, or any other similar, suitable, or conventional processing techniques. FIG. 1 shows an example of an extrusion system that may be used to make the pellet of the present invention. The cellulosic material, the polyolefin material, and any other desired ingredients may be mixed together in a mixer 20a. For example, a low intensity mixer may be used. An example of a low intensity mixer is a ribbon blender. After being mixed together, the ingredients may be transferred to a feed hopper 22a. Alternatively, some or all of the ingredients may be separately input to the feed hopper 22a using automated loss-in-weight feeders. An example of a feed hopper is a gravity feed hopper or a hopper with a force feed mechanism known as a crammer. The feed hopper 22a transfers the ingredients to a heated extruder 24a. The extruder 24a blends the ingredients under sufficient heat and pressure. Several well-known extruders may be used in the present invention, e.g., a twin screw extruder by Cincinnati Milacron (CM-80-Hp). The extruder 24a forces the composition through a die system 30a. In an exemplary embodiment, the flow rate of the extruder 24a may be between about 150 and 600 pounds per hour. In other embodiments, the flow rate may be higher or lower depending on the type and size of the extruder 24a. The die system 30a may be made up of one or more plates. The die system 30a allows the starting materials to bond and form a shaped-homogeneous product. A typical plate may be made from cast iron, hardened steel material, stainless steel material, and/or other types of metals. A cooling system (e.g., a liquid bath or spray, an air cooling system, or a cryogenic cooling system) may follow the die system 30a. The resulting extrudate 40a may be cut to an appropriate pellet size using any suitable cutting device including, but not limited to, a pelletizer or any other similar, suitable, or conventional type of pelletizing device.

It is recognized that other similar, suitable, or conventional manufacturing methods may also be implemented to make the pellets of the present invention. For instance, some or all of the individual ingredients may be fed separately into the extruder. For example, the manufacturing system may include multiple feed hoppers to introduce the individual ingredients into the extruder in proper ratios. In other words, each of the ingredients may be introduced separately into the extruder, or some (but not all) of the ingredients may be mixed together prior to being introduced into the extruder.

In one embodiment, the polyolefin material and the other additives (including inorganic fillers, if any) may be first mixed together and then introduced into the extruder separately from the cellulosic material. The cellulosic filler material may be dried and stored in a moisture-controlled environment until needed. The other components, including the polyolefin material and any inorganic fillers, lubricants, or any other additives, may be combined in a mixer or blender, such as are available from Littleford Day, Inc. or Henschel Mixers America, Inc., for example. During mixing, these materials may be raised to an elevated temperature due to the mechanical action of the mixer/blender. Upon completion of the blending of these components, the mixture may be allowed to cool to a predetermined temperature. Upon cooling to the predetermined temperature, the mixture may be introduced along with the proper ratio of cellulosic material into an extruder or injection molding machine.

In another embodiment, the cellulosic material, the polyolefin material, and other components may each be fed separately into a parallel, co-rotating, compounding, twin screw extruder in proper ratios. The extruder may mix the individual components into a homogenous cellulose composition. As the composition is expelled from the nozzle of the extruder, a cutting device (e.g., a pelletizing die, a rotating knife, or any other similar, suitable, or conventional cutting device) may render the cellulosic composition into a pelletized form. The pelletized cellulosic composition may be cooled and stored for later use.

As noted above, the pellet may include the entire amount or only a portion of the polyolefin material and the other additives. If the pellets include the entire amount of each of the ingredients, the pellets may be processed in an extruder, a compression molding apparatus, an injection molding apparatus, or any other suitable, similar, or conventional apparatus to make a desired end product. On the other hand, the pellets may be combined with the remaining ingredients to form a desired end product if the pellets only comprise a portion or none of any of the ingredients of the desired composition.

One benefit of the present invention is that a pellet may be made having a concentrated amount of cellulosic material. For example, a pellet may be made with 100% of the cellulosic content of a desired composition for an end product, but only a limited portion of the polyolefin content of the desired composition for the end product. Consequently, a concentrated pellet of the present invention may be shipped to a remote location where it may be blended with additional polyolefin material to make the end product.

An exemplary concentrated pellet of the present invention may be comprised of cellulosic material in an amount of about 55% to about 85% by weight. Polyolefin material may be included in the concentrated pellet in an amount of about 10% to about 20% by weight. The concentrated pellet may also include any other desired components for making the end product. For example, the concentrated pellet may include 0% to about 20% by weight of inorganic filler and 0% to about 10% by weight of other additives, e.g., lubricants.

Exemplary embodiments of the pellets of the present invention (including exemplary embodiments of the concentrated pellets) can be stored and later shipped to remote locations (e.g., to be combined with any remaining ingredients) without reabsorbing an appreciable amount of moisture. During pellet formation, the polyolefin material and any other ingredients may substantially encapsulate the cellulosic material. As a result, the cellulosic material in the pellets may be substantially prevented from reabsorbing moisture from the environment during storage and shipping, even if the storage or shipping environment is not moisture-controlled. Consequently, the pellets of the present invention may eliminate the need to store the cellulosic material in a moisture-controlled environment after it has been incorporated into the pellets. Furthermore, the pellets of the present invention may also eliminate the need to install expensive drying equipment at remote manufacturing facilities that would otherwise require such equipment if the cellulosic material was shipped there in non-pelletized form.

The pellets may be combined with any remaining ingredients using any suitable manufacturing system. Examples of suitable manufacturing systems include the systems described above that may be used to make the pellets, except that the final composition would be extruded in the form of the desired end product instead of being cut into pellets. If desired, any remaining ingredients may first be mixed together (e.g., with a ribbon blender, a compounder, or any other similar, suitable, or conventional mixing device) prior to being mixed with the pellets. The pellets may be combined with the remaining ingredients either in the molding device or prior to being introduced into the molding device. In addition, the pellets and the remaining ingredients may enter the molding device at the same zone or different zones.

FIG. 1 shows an example of a system that may be used to mix the pellets with the remaining ingredients before introduction into the molding device. For example, the pellets and the remaining ingredients may be combined in mixer 20a. The mixture may then be transferred to the extruder 24a via feed hopper 22a to form the desired end product.

Figure 2:
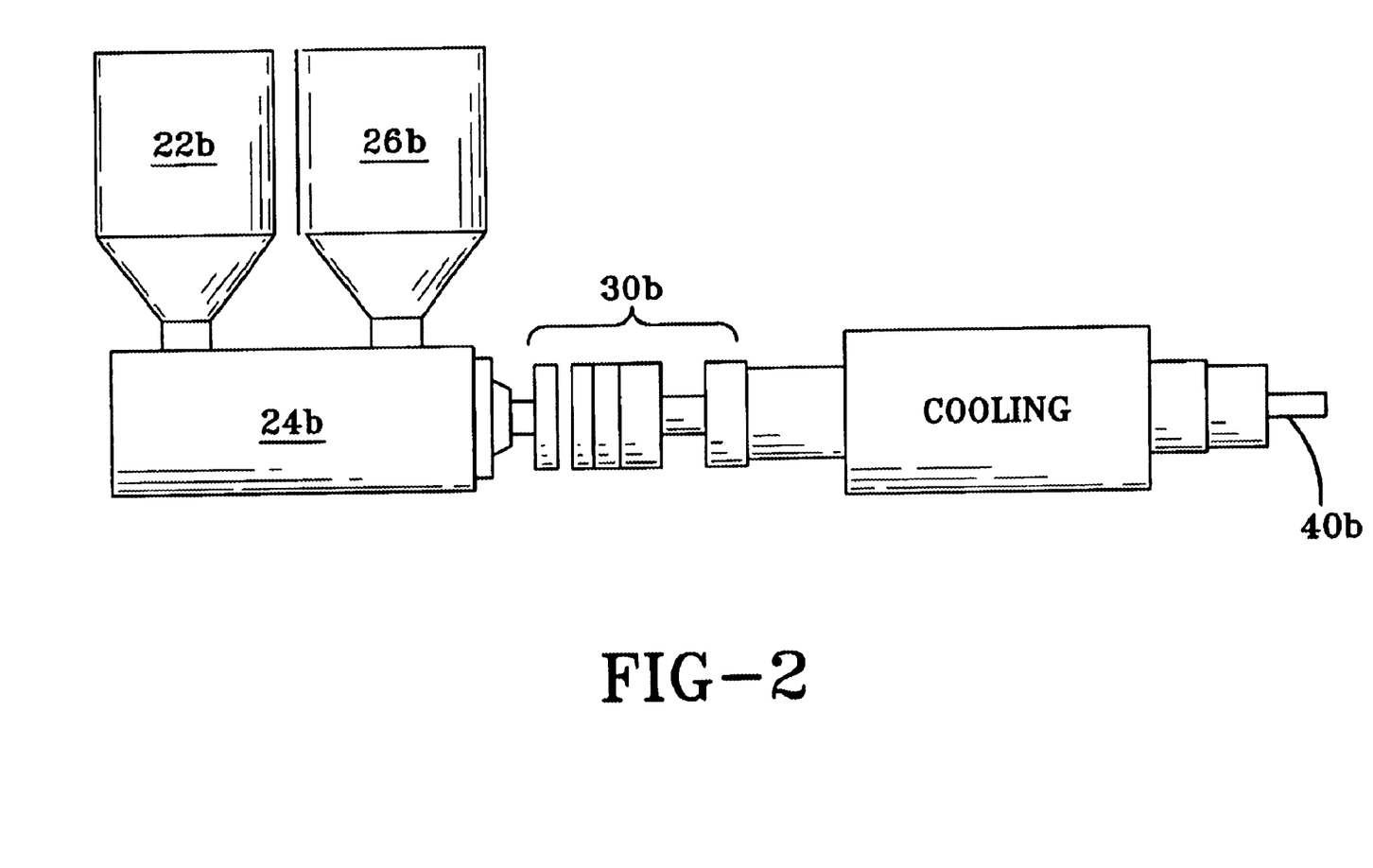
FIG. 2 is a schematic diagram of another exemplary embodiment for using a composite pellet of the present invention.

FIG. 2 shows an example in which the remaining ingredients may be introduced into the molding device separately from the pellets. The pellets may be introduced into the extruder 24b by feed hopper 22b or any other similar, suitable, or conventional device. The other ingredients (e.g., the remaining polyolefin material and any other remaining ingredients) may be introduced into the same or another zone of the extruder by feed hopper 26b or any other similar, suitable, or conventional device. The pellets may be blended with the remaining ingredients in the extruder 24b. The resulting composition may be passed through the die system 30b and optionally through a cooling system to form the desired end product 40b.

Any suitable final composition may be used to make the desired end product. An exemplary final composition comprises cellulosic material in an amount between about 35% and about 70% by weight, more preferably between about 40% and about 65% by weight, still more preferably between about 43% and about 62% by weight. In an exemplary embodiment, the polyolefin material may be present in the final composition in an amount between about 20% and about 45% by weight, more preferably between about 25% and about 40% by weight, still more preferably between about 28% and about 36% by weight. Additional ingredients (including, but not limited to, additives as noted above) may be present in the final composition in an amount between about 0% and about 45% by weight, more preferably between about 3% and about 35% by weight, still more preferably between about 5% and about 30% by weight. The amounts of the ingredients in other suitable final compositions may be outside, i.e., above or below, the above ranges.

One example of a final cellulosic/polyethylene composition is comprised of the following ingredients:

| INGREDIENT | PERCENTAGE BY WEIGHT |
|---|---|
| Wood Flour | 45 |
| High Density Polyethylene | 30 |
| Lubricant(s) | 5 |
| Inorganic Filler(s) | 20 |

Another example of a final cellulosic/polyethylene composition is comprised of the following ingredients:

| INGREDIENT | PERCENTAGE BY WEIGHT |
|---|---|
| Cellulosic Filler(s) | 54 |
| High Density Polyethylene | 34 |
| Lubricant(s) | 3 |
| Inorganic Filler(s) | 9 |

A third example of a final cellulosic/polyethylene composition is comprised of the following ingredients:

| INGREDIENT | PERCENTAGE BY WEIGHT |
|---|---|
| Cellulosic Filler(s) | 60 |
| High Density Polyethylene | 34 |
| Lubricant(s) | 6 |

In another embodiment, an example of a final cellulosic/polypropylene composition is comprised of the following ingredients:

| INGREDIENT | PERCENTAGE BY WEIGHT |
|---|---|
| Cellulosic Filler(s) | 51 |
| Polypropylene | 36 |
| Lubricant(s) | 5 |
| Inorganic Filler(s) | 8 |

EXAMPLES

Various embodiments of concentrated pellets were manufactured using an extrusion system. The extrusion system included a twin screw extruder. In each example, the temperatures of the various zones of the extruder were 365° F., 370° F., and 340° F., respectively.

In the first example, the concentrated composite was comprised of the following ingredients:

| INGREDIENT | PERCENTAGE BY WEIGHT |
|---|---|
| Cellulosic Filler(s) | 75 |
| HDPE | 20 |
| Lubricant(s) | 5 |

The ingredients were transferred to the extruder by a feed hopper operating at 15 rpm. The extruder blended the ingredients of the composite together. The torque of the extruder was 6470 m.g while exerting a pressure of 2610 psi. In addition, the extruder also exerted a 17-inch vacuum. The specific gravity of the composite was 1.06, and the composite was processed through the extruder at a rate of 31.62 grams/minute. The extrudate was cut into cylindrical pellets each having a length of about 0.5 inch and a diameter of about 0.25 inch. The ingredients of the pellet bonded well together such that the polymer substantially encapsulated the cellulosic material.

In the second example, the concentrated composite was comprised of the following ingredients:

| INGREDIENT | PERCENTAGE BY WEIGHT |
|---|---|
| Cellulosic Filler(s) | 80 |
| HDPE | 15 |
| Lubricant(s) | 5 |

The ingredients were transferred to the extruder by a feed hopper operating at 15 rpm. The extruder blended the ingredients of the composite together. The torque of the extruder was 7400 m.g while exerting a pressure of 2920 psi. In addition, the extruder also exerted a 14-inch vacuum. The specific gravity of the composite was 1.03, and the composite was processed through the extruder at a rate of 33.78 grams/minute. The extrudate was cut into cylindrical pellets each having a length of about 0.5 inch and a diameter of about 0.25 inch. The ingredients of the pellet bonded well together such that the polymer substantially encapsulated the cellulosic material.

In the third example, the concentrated composite was comprised of the following ingredients:

| INGREDIENT | PERCENTAGE BY WEIGHT |
|---|---|
| Cellulosic Filler(s) | 85 |
| HDPE | 10 |
| Lubricant(s) | 5 |

The ingredients were transferred to the extruder by a feed hopper operating at 15 rpm. The extruder blended the ingredients of the composite together. The torque of the extruder was 10,760 m.g while exerting a pressure of 3710 psi. In addition, the extruder also exerted a 12-inch vacuum. The specific gravity of the composite was 1.02, and the composite was processed through the extruder at a rate of 37.26 grams/minute. The extrudate was cut into cylindrical pellets each having a length of about 0.5 inch and a diameter of about 0.25 inch. The ingredients of the pellet bonded well together such that the polymer substantially encapsulated the cellulosic material.

In the fourth example, the concentrated composite was comprised of the following ingredients:

| INGREDIENT | PERCENTAGE BY WEIGHT |
|---|---|
| Cellulosic Filler(s) | 55 |
| HDPE | 20 |
| Lubricant(s) | 5 |
| Inorganic Filler(s) | 20 |

The ingredients were transferred to the extruder by a feed hopper operating at 15 rpm. The extruder blended the ingredients of the composite together. The torque of the extruder was 4530 m.g while exerting a pressure of 1640 psi. In addition, the extruder also exerted a 13-inch vacuum. The specific gravity of the composite was 1.13, and the composite was processed through the extruder at a rate of 39.30 grams/minute. The extrudate was cut into cylindrical pellets each having a length of about 0.5 inch and a diameter of about 0.25 inch. The ingredients of the pellet bonded well together such that the polymer substantially encapsulated the cellulosic material.

In the fifth example, the concentrated composite was comprised of the following ingredients:

| INGREDIENT | PERCENTAGE BY WEIGHT |
|---|---|
| Cellulosic Filler(s) | 60 |
| HDPE | 15 |
| Lubricant(s) | 5 |
| Inorganic Filler(s) | 20 |

The ingredients were transferred to the extruder by a feed hopper operating at 15 rpm. The extruder blended the ingredients of the composite together. The torque of the extruder was 6310 m.g while exerting a pressure of 2180 psi. In addition, the extruder also exerted a 12-inch vacuum. The specific gravity of the composite was 1.12, and the composite was processed through the extruder at a rate of 41.88 grams/minute. The extrudate was cut into cylindrical pellets each having a length of about 0.5 inch and a diameter of about 0.25 inch. The ingredients of the pellet bonded well together such that the polymer substantially encapsulated the cellulosic material.

In the sixth example, the concentrated composite was comprised of the following ingredients:

| INGREDIENT | PERCENTAGE BY WEIGHT |
|---|---|
| Cellulosic Filler(s) | 75 |
| Polypropylene | 20 |
| Lubricant(s) | 5 |

The ingredients were transferred to the extruder by a feed hopper operating at 15 rpm. The extruder blended the ingredients of the composite together. The torque of the extruder was 4450 m.g while exerting a pressure of 1630 psi. In addition, the extruder also exerted a 16-inch vacuum. The specific gravity of the composite was 0.98, and the composite was processed through the extruder at a rate of 33.72 grams/minute. The extrudate was cut into cylindrical pellets each having a length of about 0.5 inch and a diameter of about 0.25 inch. The ingredients of the pellet bonded well together such that the polymer substantially encapsulated the cellulosic material.

In the seventh example, the concentrated composite was comprised of the following ingredients:

| INGREDIENT | PERCENTAGE BY WEIGHT |
|---|---|
| Cellulosic Filler(s) | 80 |
| Polypropylene | 15 |
| Lubricant(s) | 5 |

The ingredients were transferred to the extruder by a feed hopper operating at 15 rpm. The extruder blended the ingredients of the composite together. The torque of the extruder was 5440 m.g while exerting a pressure of 2120 psi. In addition, the extruder also exerted a 13-inch vacuum. The specific gravity of the composite was 1.02, and the composite was processed through the extruder at a rate of 37.62 grams/minute. The extrudate was cut into cylindrical pellets each having a length of about 0.5 inch and a diameter of about 0.25 inch. The ingredients of the pellet bonded well together such that the polymer substantially encapsulated the cellulosic material.

In the eighth example, the concentrated composite was comprised of the following ingredients:

| INGREDIENT | PERCENTAGE BY WEIGHT |
|---|---|
| Cellulosic Filler(s) | 85 |
| Polypropylene | 10 |
| Lubricant(s) | 5 |

The ingredients were transferred to the extruder by a feed hopper operating at 15 rpm. The extruder blended the ingredients of the composite together. The torque of the extruder was 7420 m.g while exerting a pressure of 2670 psi. In addition, the extruder also exerted a 13-inch vacuum. The specific gravity of the composite was 1.03. The extrudate was cut into cylindrical pellets each having a length of about 0.5 inch and a diameter of about 0.25 inch. The ingredients of the pellet bonded well together such that the polymer substantially encapsulated the cellulosic material.

In the ninth example, the concentrated composite was comprised of the following ingredients:

| INGREDIENT | PERCENTAGE BY WEIGHT |
|---|---|
| Cellulosic Filler(s) | 55 |
| Polypropylene | 20 |
| Lubricant(s) | 5 |
| Inorganic Filler(s) | 20 |

The ingredients were transferred to the extruder by a feed hopper operating at 15 rpm. The extruder blended the ingredients of the composite together. The torque of the extruder was 3560 m.g while exerting a pressure of 1210 psi. In addition, the extruder also exerted a 13-inch vacuum. The specific gravity of the composite was 1.13, and the composite was processed through the extruder at a rate of 39.42 grams/minute. The extrudate was cut into cylindrical pellets each having a length of about 0.5 inch and a diameter of about 0.25 inch. The ingredients of the pellet bonded well together such that the polymer substantially encapsulated the cellulosic material.

In the tenth example, the concentrated composite was comprised of the following ingredients:

| INGREDIENT | PERCENTAGE BY WEIGHT |
|---|---|
| Cellulosic Filler(s) | 60 |
| Polypropylene | 15 |
| Lubricant(s) | 5 |
| Inorganic Filler(s) | 20 |

The ingredients were blended together in the extruder, and the extrudate was cut into cylindrical pellets each having a length of about 0.5 inch and a diameter of about 0.25 inch. The ingredients of the pellet bonded well together such that the polymer substantially encapsulated the cellulosic material.

Although specific operating conditions are described in the examples, the operating conditions may vary based on the equipment used, the ingredients of the composite, and the desired characteristics of the pellets. Furthermore, the present invention is not limited to a particular size or shape of pellets. The pellets may have any desired size and shape. In addition, it should be recognized that the polymer material may not substantially encapsulate all of the cellulosic material in some embodiments of the present invention.

The exemplary embodiments herein disclosed are not intended to be exhaustive or to unnecessarily limit the scope of the invention. The exemplary embodiments were chosen and described in order to explain the principles of the preset invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A method of manufacturing a molded product:
   manufacturing a pellet, said pellet comprising by weight:
   about 55% to about 90% of at least one cellulosic material;
   about 10% to about 40% of at least one polyolefin material; and
   0% to about 35% of at least one additive;
   blending said pellet with an additional amount of said at least one polyolefin material to form a final composition, said final composition comprising by weight:
   about 35% to about 70% of said at least one cellulosic material;
   about 20% to about 45% of said at least one polyolefin material; and
   0% to about 45% of said at least one additive; and
   molding said final composition to form said molded product.

2. The method of claim 1 wherein said at least one polyolefin material is selected from the group consisting of high density polyethylene, low density polyethylene, and polypropylene.

3. The method of claim 1 wherein said at least one cellulosic material is selected from the group consisting of wood flour and wood fiber.

4. The method of claim 1 wherein said at least one additive is selected from the group consisting of lubricants and inorganic fillers.

5. The method of claim 4 wherein said lubricants are selected from the group consisting of zinc stearate and ethylene bis stearamide.

6. The method of claim 4 wherein said inorganic fillers are selected from the group consisting of talc and mica.

7. The method of claim 1 wherein said pellet comprises by weight:
   about 63% to about 88% of said at least one cellulosic material;
   about 10% to about 30% of said at least one polyolefin material; and
   0% to about 27% of said at least one additive.

8. The method of claim 7 wherein said pellet comprises by weight:
   about 65% to about 85% of said at least one cellulosic material;
   about 10% to about 20% of said at least one polyolefin material; and
   about 0.5% to about 25% of said at least one additive.

9. The method of claim 1 wherein said final composition comprises by weight:
   about 40% to about 65% of said at least one cellulosic material;
   about 25% to about 40% of said at least one polyolefin material; and
   about 3% to about 35% of said at least one additive.

10. The method of claim 9 wherein said final composition comprises by weight:
    about 43% to about 62% of said at least one cellulosic material;
    about 28% to about 36% of said at least one polyolefin material; and
    about 5% to about 30% of said at least one additive.

11. The method of claim 1 wherein said molding step comprises extruding said final composition to form said molded product.

12. A method of manufacturing a synthetic wood composition:
    manufacturing a pellet, said pellet comprising by weight:
    about 55% to about 85% of at least one cellulosic material;
    about 10% to about 20% of at least one polyolefin material;
    0% to about 20% of at least one inorganic filler; and
    0% to about 10% of at least one lubricant; and
    blending said pellet with an additional amount of said at least one polyolefin material to form said synthetic wood composition, said synthetic wood composition comprising by weight:
    about 35% to about 70% of said at least one cellulosic material;
    about 20% to about 45% of said at least one polyolefin material;
    0% to about 20% of said at least one inorganic filler; and
    0% to about 10% of said at least one lubricant.

13. The method of claim 12 wherein said synthetic wood composition comprises by weight:
    about 40% to about 65% of said at least one cellulosic material;
    about 25% to about 40% of said at least one polyolefin material;
    0% to about 20% of said at least one inorganic filler; and
    0% to about 10% of said at least one lubricant.

14. The method of claim 13 wherein said synthetic wood composition comprises by weight:
    about 43% to about 62% of said at least one cellulosic material;
    about 28% to about 36% of said at least one polyolefin material;
    0% to about 20% of said at least one inorganic filler; and
    0% to about 10% of said at least one lubricant.

* * * * *

UNITED STATES PATENT AND TRADEMARK OFFICE
CERTIFICATE OF CORRECTION

PATENT NO.    : 6,632,863 B2
DATED         : October 14, 2003
INVENTOR(S)   : Herbert L. Hutchison et al.

It is certified that error appears in the above-identified patent and that said Letters Patent is hereby corrected as shown below:

Title page,
Item [56], References Cited, U.S. PATENT DOCUMENTS, please insert the following references:

| | | | |
|---|---|---|---|
| -- 5,393,536 | 2/1995 | Brandt, et al. | 425/112 |
| 5,783,125 | 7/1998 | Bastone, et al. | 264/45.3 |
| 5,827,462 | 10/1998 | Brandt, et al. | 264/179 |
| 5,836,128 | 11/1998 | Groh, et al. | 52/580 |
| 5,866,264 | 2/1999 | Zehner, et al. | 428/481 |
| 6,035,588 | 5/2000 | Zehner, et al. | 52/98 |
| 6,103,791 | 8/2000 | Zehner | 524/13 |
| 6,117,924 | 9/2000 | Brandt | 524/13 |
| 6,131,355 | 10/2000 | Groh, et al. | 52/592.1 |
| 6,153,293 | 11/2000 | Dahl, et al. | 428/310.5 |
| 6,180,257 | 1/2001 | Brandt, et al. | 428/532 |
| 6,210,616 | 4/2001 | Suwanda | 264/151 |
| 6,248,813 | 6/2001 | Zehner | 524/13 |
| 6,272,808 | 8/2001 | Groh, et al. | 52/592.1 |
| 6,284,098 | 9/2001 | Jacobsen | 162/150 |
| 6,295,778 | 10/2001 | Burt | 52/592.6 |
| 6,337,138 | 1/2002 | Zehner | 428/511 |
| 6,341,458 | 1/2002 | Burt | 52/287.1 |
| 6,344,504 | 2/2002 | Zehner, et al. | 524/14 |
| 6,358,585 | 3/2002 | Wolff | 428/36.6 |
| 6,360,508 | 3/2002 | Pelfrey, et al. | 52/520 |
| 6,423,257 | 7/2002 | Stobart, et al. | 264/145 |
| 6,453,630 | 9/2002 | Buhrts, et al. | 52/177 |
| 6,464,913 | 10/2002 | Korney, Jr. | 264/102 |
| 6,511,757 | 1/2003 | Brandt, et al. | 428/532 |
| 2002/0040557 | 9/2001 | Felton | 52/309.13 |
| 2002/0192401 | 1/2001 | Matsumoto, et al. | 428/15 |
| 2002/0192431 | 6/2001 | Edgman | 428/181 -- |

UNITED STATES PATENT AND TRADEMARK OFFICE
CERTIFICATE OF CORRECTION

PATENT NO. : 6,632,863 B2
DATED : October 14, 2003
INVENTOR(S) : Herbert L. Hutchison et al.

It is certified that error appears in the above-identified patent and that said Letters Patent is hereby corrected as shown below:

<u>Column 7,</u>
Line 26, please delete "365° F.," and insert -- 365 °F, --.
Line 27, please delete "370° F., and 340° F.," and insert -- 370 °F, and 340 °F, --.

Signed and Sealed this

Tenth Day of February, 2004

JON W. DUDAS
*Acting Director of the United States Patent and Trademark Office*